Oct. 31, 1950
M. C. DAVIS
2,528,343
COUPLING FLANGE
Filed March 19, 1948
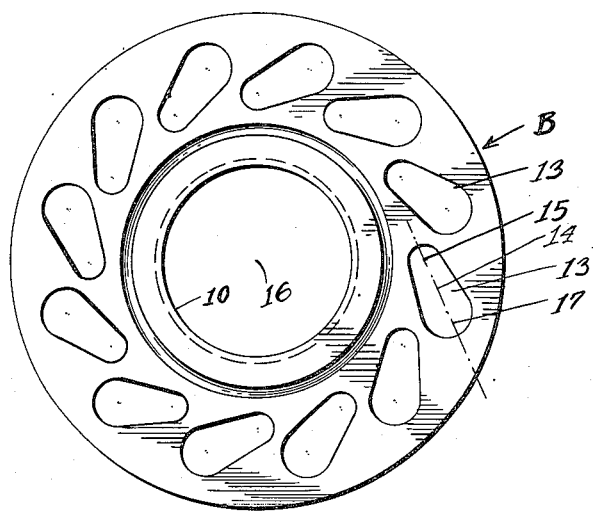
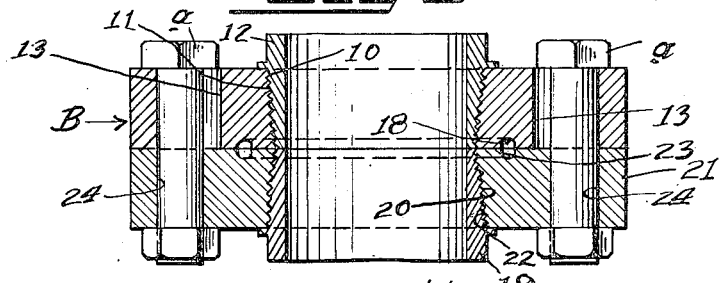
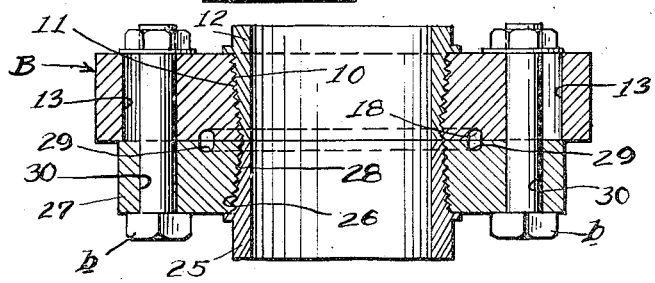
Inventor
Melvin C. Davis
By Wilfred E. Lawson
ATTORNEY Patented Oct. 31, 1950

2,528,343

UNITED STATES PATENT OFFICE 2,528,343

COUPLING FLANGE

Melvin C. Davis, Denver, Colo.

Application March 19, 1948, Serial No. 15,905

4 Claims. (Cl. 285—130)

This invention appertains to coupling flanges for connecting up pipe lines made up of lengths of flanged pipe, such as well casings, and it has for an object to provide one of a novel construction that will allow the effective coupling together of the flanged ends of adjacent pipe lengths regardless of whether or not the bolt holes in the pipe flanges are equal in number, or are located at different distances from the axial center of the pipes.

Another object of my invention is to provide a companion flange of the character indicated above adapted to be used in connection with a plurality of other casing flanges or the like, each of which requires the use of bolts of a different thickness than the other casing flanges.

Other objects of my invention not specifically mentioned may appear in the following specification describing my invention with reference to the accompanying drawing illustrating a preferred embodiment of my invention. It is however to be understood, that my invention is not to be limited or restricted to the exact construction or combination or parts described in the specification and shown in the drawing, but that such changes and modifications can be made, which fall within the scope of the claims appended hereto.

In order that my invention may be better understood, I will proceed now to describe it with reference to the accompanying drawing, in the several figures of which similar parts are designated by similar reference characters, and wherein:

Figure 1 is a top plan view of a companion or drilling flange according to the invention;

Figure 2 is a vertical diametrical view through a pipe equipped with a flange according to the invention and bolted to a conventional flange of the same diameter which is secured to another pipe, and Figure 3 is a sectional view similar to Figure 2, showing the flange according to the invention to aflange the bolt holes of which are located on a bolt hole circle having a smaller diameter than the corresponding circle in Figure 2.

The drilling or companion flange as herein embodied comprises a flat annular body B defining a threaded central opening 10 adapted to threadedly engage the threaded end portion 11 of a pipe 12 adapted to be used as a part of a well casing or the like. The body B is provided with a plurality of slots 13 equidistantly spaced around the flange. The longitudinal center line 14 of each slot extends chordally with respect to the circumference of the flange body. The inner ends 15 of the longitudinal center lines 14 of the slots 13 are located at equal radial distances from the axial center 16 of the drilling flange and at equal arcuate distances from each other.

The outer ends 17 of the longitudinal center lines 14 of the slots 13 are also arranged at equal radial distances from the axial center 17 of the drilling flange and at equal arcuate distances from each other. The slots 13 increase in width from the inner ends to the outer ends.

In Figure 2 a drilling flange of the kind described above is shown secured to a conventional pipe flange 18. This conventional flange is threadedly mounted on the threaded end portion 19 of another pipe 20 adapted to form a part of a wall casing or the like. The flange 18 is of the same outside diameter as the drilling flange B and is provided with a plurality of equidistantly spaced bolt holes 21 equal in number to the slots 13 in the companion flange. The two flanges B and 18 are secured to each other by means of a plurality of bolts 22, each of which extends through one of the slots 13 and one of the bolts holes 21 and is secured in position by a nut 23.

In Figure 3 a drilling flange 13 of the kind described above is shown secured to a conventional pipe flange 24 threadedly mounted on the threaded end portion 25 of a pipe 26 adapted to be used as a part of a well casing or the like. This conventional pipe flange 24 has a smaller outside diameter than the conventional flange 18 shown in Figure 2 but is provided with an equal number of bolt holes 27 as the flange 18. The bolt holes 27 are located on a bolt hole center circle of smaller diameter than the bolt hole center circle, on which the bolt holes 18 are located. The bolt holes 27 are equidistantly spaced from each other and are of a smaller diameter than the bolt holes 18. The two flanges B and 27 are connected with each other by means of a plurality of bolts 28, each of which extends through one of the bolt holes 27 and one of the slots 13 and is secured in position by means of a nut 29.

In the outer surface of each of the above decribed flanges an annular groove 30 is provided, which is arranged, concentrically to the corresponding flange and all the grooves are of equal diameter. An annular packing or gasket 31 or the like is located in the grooves of abutting flanges to form a leak-proof joint, when the flanges are connected with each other.

The above description shows clearly, that a drilling or companion flange according to my invention is adapted to be used for the purpose of connecting a pipe, on which said companion flange is mounted with other pipes equipped with conventional flanges provided with the same number of bolt holes, even when said bolt holes in the several conventional flanges are of different inside diameters and are located on bolt like hole center circles of different diameters, so that the bolt holes are arranged in each individual flange at equal arcuate distances from each other, but are spaced in the several flanges at different arcuate distances from each other.

I claim:

1. A coupling flange comprising an annular body defining a central opening and provided with a plurality of slots distributed equidistantly from each other about the body between the inner and outer peripheries thereof, the longitudinal center line of each slot extending chordally to the circumference of the body.

2. A coupling flange as set forth in claim 1, wherein the inner ends of the longitudinal center lines of the slots are located radially at equal distances from the axial center of the body and at equal arcuate distances from each other.

3. A coupling flange as set forth in claim 1, wherein the inner ends of the longitudinal center lines of the slots are located radially at equal distances from the axial center of the body and at equal arcuate distances from each other, the outer ends of the longitudinal center line being located radially at equal distances from the axial center of said body and at equal arcuate distances from each other.

4. A coupling flange as set forth in claim 1, wherein the slots increase in width from their inner ends toward their outer ends.

MELVIN C. DAVIS.

REFERENCES CITED

The following references are of record in the file of this patent:

UNITED STATES PATENTS

| Number | Name | Date |
|---|---|---|
| 794,764 | Wolf | July 18, 1905 |
| 2,161,956 | Robertson | June 13, 1939 |